(12) United States Patent
Ogawa et al.

(10) Patent No.: US 7,243,972 B2
(45) Date of Patent: Jul. 17, 2007

(54) VEHICLE BODY PANEL STRUCTURE

(75) Inventors: Hirosumi Ogawa, Yokosuka (JP); Hiroaki Harata, Yokohama (JP); Hiroki Nagayama, Yokohama (JP); Hiroaki Miura, Kamakura (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 10/713,151

(22) Filed: Nov. 17, 2003

(65) Prior Publication Data

US 2004/0124668 A1 Jul. 1, 2004

(30) Foreign Application Priority Data

Dec. 27, 2002 (JP) .............................. 2002-381886

(51) Int. Cl.
*B60J 5/00* (2006.01)
(52) U.S. Cl. .................................. 296/39.3; 296/146.7
(58) Field of Classification Search ............... 296/39.1, 296/39.3, 146.5, 146.7
See application file for complete search history.

(56) References Cited

U.S. PATENT DOCUMENTS

| | | | |
|---|---|---|---|
| 4,451,514 A * | 5/1984 | Hunt ............................ 428/71 |
| 4,932,315 A | 6/1990 | Dixon | |
| 5,196,253 A * | 3/1993 | Mueller et al. ............. 428/138 |
| 5,586,797 A * | 12/1996 | Hirahara et al. ......... 296/146.6 |
| 5,658,652 A * | 8/1997 | Sellergren ..................... 428/71 |
| 5,707,098 A * | 1/1998 | Uchida et al. ........... 296/146.6 |
| 5,884,434 A * | 3/1999 | Dedrich et al. ................ 49/503 |
| 6,302,466 B1 * | 10/2001 | Zwick ........................ 296/39.3 |
| 6,482,496 B1 * | 11/2002 | Wycech ....................... 428/71 |
| 6,669,265 B2 * | 12/2003 | Tilton et al. ............. 296/146.1 |

FOREIGN PATENT DOCUMENTS

| | | |
|---|---|---|
| DE | 92 07 113 U1 | 8/1992 |
| EP | 0 365 395 A1 | 4/1990 |
| FR | 2 256 658 | 7/1975 |
| FR | 2 606 712 A1 | 5/1988 |
| JP | 2001-158306 A | 6/2001 |
| JP | 2002-12094 A | 1/2002 |

\* cited by examiner

*Primary Examiner*—Joseph D. Pape
(74) *Attorney, Agent, or Firm*—Foley & Lardner LLP

(57) ABSTRACT

A vehicle body panel structure comprises an outer panel, an inner panel facing the outer panel, and a trim of a cabin interior. In the vehicle body panel structure, at least one surface of a back surface of the outer panel, both surfaces of the inner panel, and a surface of the trim facing the outer panel has both functions of heat insulation and heat dissipation by partially providing a heat insulation section to insulate heat for the at least one surface.

35 Claims, 9 Drawing Sheets

FIG.9

| | panel 19 | | panel 17 | |
|---|---|---|---|---|
| | Heat insulation section | "Heat insulator (Heat insulation method)" | Heat insulation section | "Heat insulator (Heat insulation method)" |
| Ex.1 | None | | Upper half | Al deposited PET Film |
| Ex.2 | None | | Upper half | Al Foil |
| Ex.3 | None | | Upper half | "Film coated by Al containing coating material" |
| Ex.4 | None | | Upper half | Al containg coating material |
| Ex.5 | Upper half | Al deposited PET Film | None | |
| Ex.6 | Upper half | Al deposited PET Film | Upper half | Al deposited PET Film |
| Ex.7 | None | | Area of 70% | Al deposited PET Film |
| Ex.8 | None | | Upper half | "PP form sheet (thickness of 1mm)" |
| Ex.9 | None | | Upper half | "PP form sheet (thickness of 2mm)" |
| Ex.10 | None | | Upper half | "Nonwoven fabric (thickness of 10mm)" |
| Ex.11 | None | | Upper half | "PP form sheet (thickness of 1mm) + Al deposited PET Film" |
| Ex.12 | Upper half | "PP form sheet (thickness of 1mm)" | Upper half | Al deposited PET Film |
| Ex.13 | None | | Upper half | Al deposited PET Film |
| Ex.14 | None | | Upper half | Al deposited PET Film |
| Ex.15 | None | | Upper half | Al deposited PET Film |
| Ex.16 | None | | Upper half | Al deposited PET Film |
| Com. Ex.1 | None | | None | |
| Com. Ex.2 | None | | Entire area | Al deposited PET Film |
| Com. Ex.3 | Entire area | Al deposited PET Film | None | |
| Com. Ex.4 | None | | Entire area | "PP form sheet (thickness of 1mm)" |

FIG.10

| | panel 19 | | panel 17 | |
|---|---|---|---|---|
| | Heat dissipation section | "Heat dissipation material (Heat dissipation method)" | Heat dissipation section | "Heat dissipation material (Heat dissipation method)" |
| Ex.1 | None | | Lower half | None |
| Ex.2 | None | | Lower half | None |
| Ex.3 | None | | Lower half | None |
| Ex.4 | None | | Lower half | None |
| Ex.5 | None | | Lower half | None |
| Ex.6 | None | | Lower half | None |
| Ex.7 | None | | Area of 30% | None |
| Ex.8 | None | | Lower half | None |
| Ex.9 | None | | Lower half | None |
| Ex.10 | None | | Lower half | None |
| Ex.11 | None | | Lower half | None |
| Ex.12 | None | | Lower half | None |
| Ex.13 | None | | Lower half | Ventilation holes |
| Ex.14 | None | | Lower half | High emissivity coating |
| Ex.15 | Lower half | High emissivity coating | Entire area | High emissivity coating |
| Ex.16 | None | | Entire area | "Iron sheet, PP sheet and High emissivity coating" |
| Com. Ex.1 | None | | None | |
| Com. Ex.2 | None | | None | |
| Com. Ex.3 | None | | None | |
| Com. Ex.4 | None | | None | |

FIG.11

|  | Surface temperature(°C) | | Air temperature(°C) | |
| --- | --- | --- | --- | --- |
|  | Upper part | Lower part | Upper part | Lower part |
| Ex.1 | 55.3 | 54.6 | 54.7 | 53.1 |
| Ex.2 | 55.5 | 54.8 | 54.7 | 53.2 |
| Ex.3 | 56.1 | 54.8 | 55.7 | 56.2 |
| Ex.4 | 55.2 | 54.3 | 54.7 | 54.1 |
| Ex.5 | 54.8 | 54.1 | 54.2 | 53.7 |
| Ex.6 | 55.3 | 54.2 | 54.6 | 53.7 |
| Ex.7 | 52.9 | 49.8 | 50.2 | 49.3 |
| Ex.8 | 54.9 | 54.6 | 53.4 | 53.1 |
| Ex.9 | 56.1 | 54.8 | 54.9 | 54.2 |
| Ex.10 | 55.4 | 54.4 | 54.6 | 53.8 |
| Ex.11 | 56.7 | 54.2 | 55.2 | 53.8 |
| Ex.12 | 54.5 | 53.2 | 52.9 | 52.7 |
| Ex.13 | 52.9 | 50.4 | 51.7 | 50.1 |
| Ex.14 | 52.3 | 49.2 | 51.4 | 48.8 |
| Ex.15 | 52.4 | 51.9 | 51.7 | 51.2 |
| Ex.16 | 53.1 | 52.9 | 51.4 | 51.0 |
| Com. Ex.1 | 78.4 | 71.1 | 76.9 | 70.9 |
| Com. Ex.2 | 68.2 | 64.5 | 66.9 | 62.5 |
| Com. Ex.3 | 67.9 | 65.4 | 66.5 | 64.2 |
| Com. Ex.4 | 72.5 | 68.5 | 70.4 | 67.0 |

VEHICLE BODY PANEL STRUCTURE

BACKGROUND OF THE INVENTION

1. Field of the Invention

The present invention relates to a vehicle body panel structure which can reduce summer heat and provide a comfortable thermal environment. Specifically, the present invention relates to a vehicle body panel structure which is provided with both functions of insulation and dissipation of heat to allow interception of incoming heat from the outside and promotion of dissipation of heat from a cabin interior for the purposes of reduction in atmospheric temperature in the cabin and reduction of the temperature of the vehicle interior parts when a vehicle is parked in blazing sunshine.

2. Description of the Related Art

Temperature inside a cabin of a vehicle placed in blazing sunshine becomes very high. In a measurement example of a summer environment in Japan, the cabin's air temperature reaches nearly 70° C. in the case of a parked vehicle. Simultaneously, as for the temperature of interior materials in the cabin, the temperature of the top surface of an instrument panel rises to nearly 100° C., and the temperature of the ceiling rises to nearly 70° C. Needless to say, it is unpleasant for occupants to get into the vehicle in such circumstances. Even when a ventilation or air-conditioning apparatus is activated, the temperature of the interior materials is not easily reduced, and radiation heat continues to be dissipated toward occupants for a long time. Accordingly, the comfort of the occupants is greatly impaired. One of causes of such an increase in temperature is intrusion of solar radiation into the cabin and intrusion of heat from a vehicle body panel which has absorbed the solar radiation into the cabin. Other causes include insufficient elimination or dissipation of heat accumulated in the cabin to the outside.

In order to suppress such an increase in temperature, measures to reduce the amount of intruding heat have hitherto been considered.

As a target for the above-described measures, first, the vehicle's glass is conceived. The transmittance of solar radiation into the cabin is reduced by adjusting the composition of glass so that the glass absorbs part of the solar radiation. Taking windshield glass as an example, the transmittance of solar radiation is reduced to, for example, 45% to 53% in existing vehicles. The amount of solar radiation coming into the cabin through the glass is thus reduced.

As another target for the above-described measures, next, an outer panel is conceived. In terms of heat transfer via an outer panel, there are cases of taking measures for the front surface of the outer panel, namely, a surface exposed to the solar radiation and taking measures for the back surface side of the outer panel. A coating material suppressing absorption of solar radiation in the front surface of the outer panel, which is publicly known, for example, in a construction field, does not satisfy application requirements in a field which requires high designability like the outer panel of the vehicle. On the contrary, as the measure for the back surface side of the outer panel, there have been known a measure focusing on a surface facing the back surface of the outer panel, namely, the back surface of the interior constituting a cabin, and a measure focusing on a back surface itself of the outer panel (see Japanese Patent Applications Laid-Open No. 2001-158306 and No. 2002-012094).

SUMMARY OF THE INVENTION

In the technology described in the Japanese Patent Application Laid-Open No. 2001-158306, heat intrusion is prevented by making most of the back surface of the interior have low emissivity. Accordingly, this technology works against the case where the escape of heat which has once entered the cabin is intended, namely, where dissipation of heat from the inside of the cabin to the outside is intended. In the technology described in the Japanese Patent Application Laid-Open No. 2002-012094, heat penetration is prevented by attaching a thin heat insulator to most part of the back face of the outer panel. Accordingly, this technology works against dissipation of heat from the inside of the cabin to the outside. There is no conventional art that takes account of dissipation of heat in the air of the cabin, the outer panel, and the interior, and there is no conventional art that improves the environment in the cabin by conducting insulation and dissipation of heat in a balanced manner.

An object of the present invention is to suppress heat intrusion from a part of the outer panel which is subjected to heat to the cabin interior and prevent the cabin interior and the parts themselves such as the outer panel and the interior from significantly increasing in temperature. Furthermore, another object of the present invention is to lower the atmospheric temperature of the cabin interior by promoting dissipation of heat from the cabin interior to the outside and lower the temperature of the parts by radiating the heat absorbed by the parts to the outside of the vehicle.

The first aspect of the present invention provides a vehicle body panel structure, comprising: an outer panel; an inner panel facing the outer panel; and a trim of a cabin interior, wherein at least one surface of a back surface of the outer panel, both surfaces of the inner panel, and a surface of the trim facing the outer panel has both functions of heat insulation and heat dissipation by partially providing a heat insulation section to insulate heat for the at least one surface.

The second aspect of the present invention provides a vehicle body panel structure, comprising: an outer panel; an inner panel facing the outer panel; and a trim of a cabin interior, wherein at least one surface of a back surface of the outer panel, both surfaces of the inner panel, and a surface of the trim facing the outer panel has both functions of heat insulation and heat dissipation by partially providing a heat insulation means for insulating heat for the at least one surface.

BRIEF DESCRIPTION OF THE DRAWINGS

The invention will now be described with reference to the accompanying drawings wherein;

FIG. 9 is a table showing heat insulation sections and heat insulators in examples and comparative examples;

FIG. 10 is a table showing heat dissipation sections and heat dissipation materials in the examples and the comparative examples; and FIG. 11 is a table showing results of measurements in the examples and the comparative examples.

DETAILED DESCRIPTION OF THE PREFERRED EMBODIMENTS

Hereinafter, description will be made of embodiments of the present invention with reference to the drawings.

A description will be given to a principle and a constitution of the present invention.

An examination reveals that, in panels of a vehicle left in blazing sunshine, especially in vertical panels, the quantity of heat flux received is not uniform. The quantity of heat flux is obviously larger in a portion which is at an angle closer to 90 degrees with respect to the direction of the sunlight, namely, in the upper part of the panel. Specifically, heat transfer from the outer panel to the cabin interior occurs in the upper part of the outer panel, which is mainly exposed to the solar radiation. Modes of this heat transfer include radiation from the outer panel to the cabin interior and thermal convection through air therebetween. By this heat transfer, the temperature inside the cabin is higher than that outside the vehicle. More specifically, the temperature of the space and the interior surface in the upper part of the cabin is higher than those in the lower part of the cabin, respectively. Accordingly, heat is transferred from the top to the bottom in the cabin. Since even the temperature in the lower part of the cabin, which is relatively low, is higher than the temperature outside the vehicle, dissipation of heat from the inside of the lower part in the cabin to the outside of the vehicle is caused. However, little quantity of heat flux is radiated in the conventional art, and is insufficient to improve the thermal environment inside the cabin.

Figure 1:
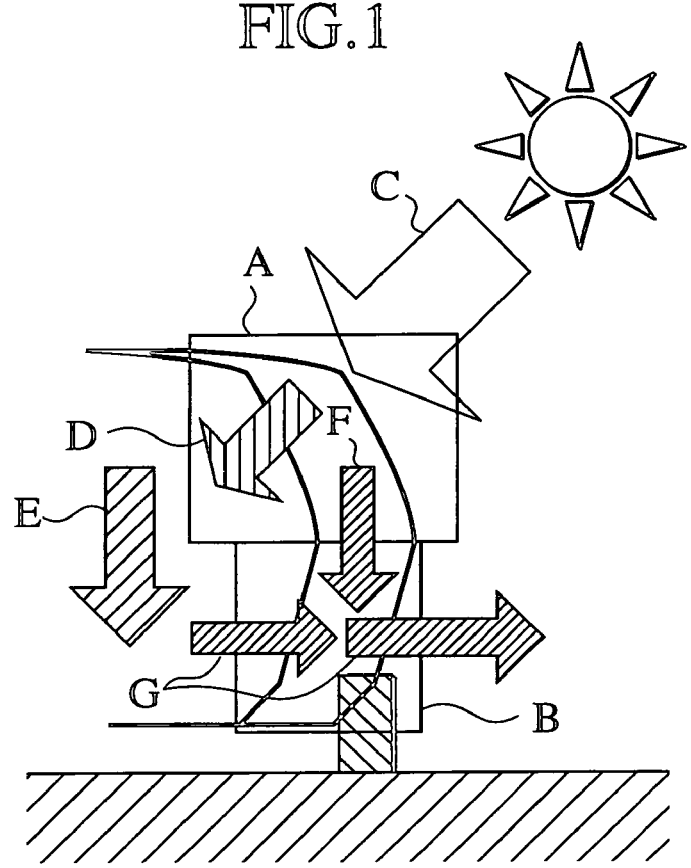
FIG. 1 is a cross-sectional view showing a vehicle body for explanation of improvement in thermal environment in a cabin by a vehicle body panel structure of the present invention.

A description will be given of how the thermal environment inside the cabin is improved by the present invention with reference to FIG. 1. FIG. 1 schematically shows a cross section of a vehicle body panel structure.

The vehicle body panel structure of the present invention is characterized by focusing attention on an outer panel mainly exposed to solar radiation C and an upper section A where an interior material facing the outer panel is located, and by performing heat insulation treatment therefor.

By such heat insulation treatment, heat D intruding into the cabin is reduced to suppress an increase in temperature inside the cabin, especially in the upper section A. However, since the section A is subjected to the heat insulation treatment, dissipation of heat to the outside of the vehicle is unlikely to occur in the section A. Herein, the lower part of the vehicle is exposed to solar radiation, but the solar radiation in the lower part is less than that of the upper part. Moreover, the temperature inside the lower part of the cabin is higher than that of the outside of the vehicle. Accordingly, the lower part serves as a section for dissipation of heat.

At this time, part of the heat received by the front surface of the outer panel is reflected or radiated to exit to the outside of the vehicle. However, most of the heat is accumulated in the parts themselves such as the outer panel and the interior, and in the air between the panel and the interior, and especially, in the upper part of the parts and in the air present in the upper part. Heat which has entered the cabin through the upper section A increases the temperature of the upper part of the cabin and makes the temperature higher than that of the lower part of the cabin. The heat accumulated in the above parts and the air between the panel and the interior, especially, the heat accumulated in the upper parts of the parts and the air present in the upper part of the cabin similarly increases the temperature in the upper part of the vehicle body and makes the temperature higher than that of the lower part of the vehicle body.

Since temperature differences occur inside the cabin in such a manner, heat E is transferred from the top to the bottom of the cabin and heat F is transferred from the top to the bottom of the parts. Herein, since a lower section B of the outer panel and the interior material on the cabin side facing the outer panel are not subjected to the heat insulation treatment, heat is easily radiated from the inside to the outside of the cabin. This enables the transferred heat E and F to exit through the lower part of the outer panel (dissipation of heat G).

Moreover, some ideas may be made to promote dissipation of heat in the lower section B. As the method of promoting dissipation of heat, any one of the methods of promoting heat transfer from the inside of the cabin to the outer panel, promoting heat transfer by radiation from the back surface of the interior to the back surface of the outer panel, and promoting thermal conduction of the interior itself, or any combination thereof may be employed. Details thereof will be described later.

Heat transfer from the outside to the inside of the cabin is broadly classified into two modes of radiation and thermal convection/thermal conduction. There is a need for methods of insulating heat corresponding to the respective modes. When the heat transfer is suppressed by the heat insulation treatment, it is possible to suppress a great increase in air temperature inside the cabin. In the gap between the surfaces facing each other like the back surfaces of the outer panel and the interior, radiation depends on the surface temperatures and the emissivities of both. When the emissivity is lower, the quantity of radiated heat is reduced. On the other hand, to reduce the quantity of heat flux by the thermal convection/thermal conduction, it is sufficient to lower the thermal conductivity. The quantity of transferred heat is thus reduced in the case of the same difference in temperature.

As the method of heat insulation of the upper parts of the back surface of the outer panel and the surface of the cabin interior facing the outer panel, reduction in emissivity has been cited, and the effect thereof will be described below. Specifically, by reducing the emissivity of the back surface of the outer panel, the quantity of heat flux transferred by radiation can be reduced for thermal insulation. Moreover, by reducing the emissivity of the surface of the cabin interior facing the outer panel, in other words, by increasing the reflectivity thereof, it becomes difficult for the cabin interior to absorb the radiation from the back surface of the outer panel and it can be insulated.

The emissivity described in the present invention is emissivity for heat rays with wavelengths of 3 μm to 30 μm, namely, for the wavelengths in the far-infrared region. The wavelengths in the same region are main wavelengths of heat rays radiated from the outer panel and the surface facing the same in the vehicle left in blazing sunshine. As the measurement method of the emissivity, for example, a method compliant with the standard of ASTM (American Society For Testing and Materials) C1371-98 can be used.

Next, a description will be given to embodiments of the present invention.

The outer panel described in the present invention is a vehicle body structural member. The back surface of the outer panel in the present invention means an opposite surface to a surface constituting an exterior of the vehicle. In the present invention, it is preferable that a surface facing this back surface of the outer panel exists. Desirably, this surface facing the back surface of the outer panel includes elements constituting the cabin interior, namely, interior trim members and the inner panel.

The interior trim members are, for example, a door trim, a door inner panel, a head lining, a pillar garnish, a door damp proof sheet, and the like. The surface facing the back surface of the outer panel herein is a surface part of which faces the back surface of the outer panel across a gap including air. The material of the interior trim member includes at least one selected from a group consisting of polyethylene terephthalate, polypropylene, polyethylene, an acrylic sheet, and a styrene sheet. In addition, the materials of the interior trim members can include materials generally used such as phenol resin, polyphenylene oxide resin, and a wooden board. The inner panel includes a steel sheet and a rustproof coating material.

The outer panel includes a steel sheet and a rustproof coating material. The outer panel described herein includes at least one of door, pillar, fender, roof, body side, and trunk lid panels. Panels especially targeted are the vertical outer panels such as the door, pillar, fender, and body side panels.

The vehicle body panel structure is characterized by partial heat insulation in at least one surface of the outer panel, the inner panel facing the same, or the trims of the cabin interior.

In one of the embodiments for heat insulation according to the present invention, a film having at least one surface of low emissivity is attached to part of the back surface of the outer panel or the surface of the cabin interior facing the outer panel so that the low emissivity surface of the film faces the surface facing the outer panel. In other words, in the case where the film is attached to the back surface of the outer panel, the low emissivity surface is faced toward the cabin interior. In the case where the film is attached to the surface of the cabin interior facing the outer panel, the low emissivity surface is faced toward the outer panel.

It is preferable that the film is attached to the upper parts of the outer panel and the trims of the cabin interior. The film to be attached desirably includes at least one selected from a group consisting of an aluminum foil, a copper foil, an aluminum foil with a surface protected with a transparent resin layer, a copper foil with a surface protected with a transparent resin layer, a resin film with aluminum adhered thereto, a resin film with reflective coating material applied thereto, and a resin film with a reflector and/or white pigment mixed therein.

In the case where the film to be attached is an aluminum foil, a copper foil, an aluminum foil with a surface protected with a transparent resin layer, or a copper foil with a surface protected with a transparent resin layer, preferably, the thickness thereof is 1 μm to 1000 μm. Especially, thickness of 5 μm to 50 μm is suitable. When the thickness is less than 1 μm, the strength of the film is low, and the film could be easily damaged when handled. On the contrary, when the thickness exceeds 1000 μm, the film lacks flexibility, and workability in attachment is lowered.

Types of a resin film with aluminum adhered thereto, a resin film with reflective coating material applied thereto, and a resin film with a reflector and/or white pigment mixed therein are not particularly limited, but polyester and polyethylene are suitable therefor in the light of heat resistance and flexibility. The resin film with a thickness of 5 μm to 100 μm is suitable in handling. The thickness at which the aluminum is adhered thereto is desirably in a range of 5 μm to 100 μm. When the thickness is less than 5 μm, the reflection effect is inadequate, and when the thickness is more than 100 μm, the film causes an increase in costs. For the method of adhering aluminum, deposition is suitable. For the reflective coating material, an aluminum flake based coating material can be used. The thickness of the applied coating material is desirably in a range of 10 nm to 100 μm. When the thickness is less than 10 nm, the reflective effect is inadequate, and when the thickness is more than 100 μm, the reflective coating could easily be broken. The content of the reflector or the white pigment mixed in resin is 0.001 mass % to 2 mass %. When the content is not more than 0.001 mass %, the transmittance is high, and when not less than 2 mass % of the reflector or the white pigment is mixed in resin, the resin is difficult to be formed into a film.

This film is attached using an adhesive. For the adhesive, an epoxy adhesive, a urethane adhesive, a hot-melt adhesive, and the like can be used, and for a particularly suitable adhesive, the epoxy adhesive is cited. The epoxy adhesive of the present invention mainly includes epoxy resin, hardener, and high thermal conductivity material. The epoxy resin which is typically used in the epoxy adhesive is not particularly limited. Examples thereof can include bisphenol A type epoxy resin obtained from bisphenol A and epichlorohydrin. The hardener is a material typically used in the epoxy resin, and is not particularly limited. Examples thereof include aliphatic polyamine, polyamide, aromatic polyamine, acid anhydride, diamides, phenol resin, and silicone. The content of the hardener is properly selected according to the types of the epoxy resin and the hardener.

In another embodiment for heat insulation according to the present invention, a coating material that allows a surface having low emissivity after coating is attached to the above-described sections.

The thickness of the low emissivity paint film is preferably 1 μm to 100 μm, and more preferably, 10 μm to 50 μm. When the paint film thickness is less than 1 μm, reduction in emissivity is inadequate, and when the paint film thickness is more than 100 μm, a problem such as a paint film peeling will occur. The coating which makes a surface to have low emissivity includes a reflector. The reflector mainly includes aluminum flakes. It is desirable that the reflector accounts for 3 mass % to 90 mass % of the entire coating material. When the content is less than 3 mass %, the effect thereof does not appear, and when the content is more than 90 mass %, adequate adhesion cannot be ensured.

Vehicles used to disperse the reflector and/or white pigment are acrylic resin, epoxy resin, polyamide resin, polyurethane resin, polyester resin, polybutadiene resin, and modified resin thereof. As the method of application, a method such as spraying and dipping can be used. The thickness of the paint film is preferably 1 μm to 100 μm, and more preferably, 10 μm to 50 μm. When the thickness of the paint film is less than 1 μm, the function of reducing the emissivity becomes inadequate, and when the thickness thereof is more than 100 μm, a problem such as peeling of the paint film will occur.

In still another embodiment for heat insulation of the present invention, a heat insulator sheet is attached to the aforementioned portions.

The heat insulator sheet is selected from a group consisting of a foamed resin sheet, nonwoven fabric, and web. As the foamed resin sheet, a sheet is suitable which uses, for example, polypropylene, polyethylene, polystyrene, or polyurethane and is expanded 5 to 40 times the original size, and is SLIMACE made by FURUKAWA ELECTRIC CO., LTD or the like. The nonwoven fabric is THINSULATE made by SUMITOMO 3M Co., LTD. or the like.

Figure 2:
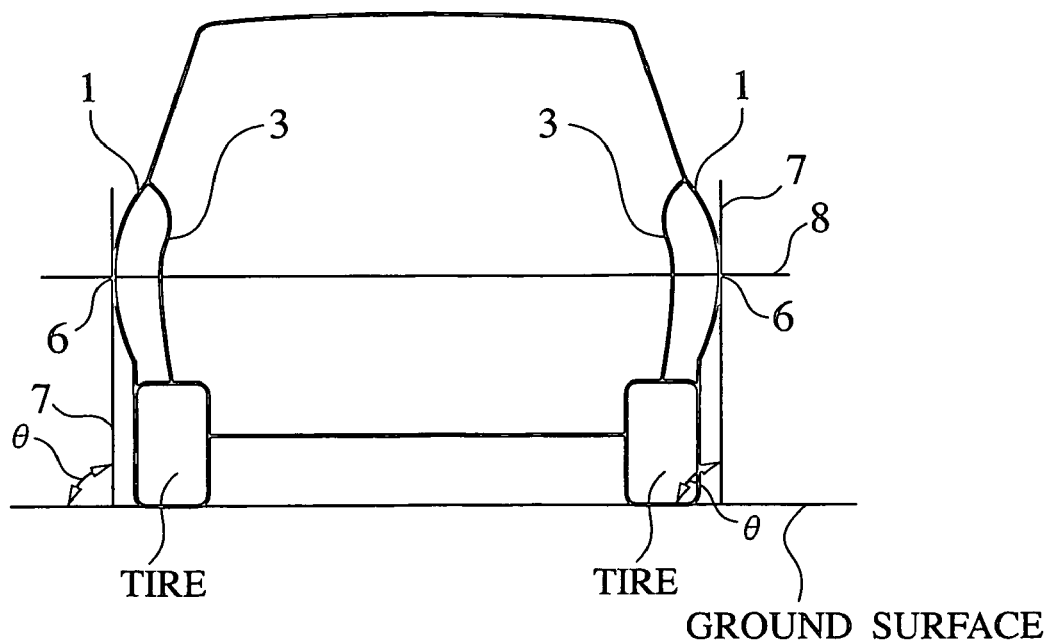
FIG. 2 is a cross-sectional view showing the vehicle body for explanation of a border line.

It is preferable that the border between the section providing the heat insulation function and the section providing the heat dissipation function is in a width range of 15 cm above and below a centering line which connects points at which the tangent lines on the front surface of the outer panel and the ground form 90 degree angles. The ground indicates a flat ground on which the vehicle does not incline. Specifically, as shown in FIG. 2, it is preferable that the border between the section providing the heat insulation function and the section providing the heat dissipation function is in a width range of 15 cm above and below a centering line 8. The line 8 is made by connecting points 6 at which angles θ formed by tangent lines 7 on the surfaces of outer panels which exist in the right and left of the vehicle body and the ground are 90 degrees. The portion above this line 8 is subject to solar radiation, and the portion therebelow faces the ground and is suitable for the heat dissipation section. The width range of 15 cm above and below the centering line 8 is decided considering the ease of heat insulation treatment work, the situation where the vehicle is placed, and the shape of the vehicle. When the border is provided more than 15 cm above the line 8, the heat insulation section is reduced, so that intruding heat due to solar radiation increases. Thereby, dissipation of heat does not catch up with the increasing heat. On the contrary, when the border is provided more than 15 cm below the line 8, the heat intrusion due to solar radiation can be adequately prevented, but the heat is difficult to be radiated because the heat dissipation portion is reduced. In the case where there are a plurality of the lines 8, it is desirable that the aforementioned border is provided in a width range of 15 cm above and below the centering line 8 closest to the ground. This is because suppressing the heat intrusion is the first priority.

The above-described embodiments providing the heat insulation function are shown in FIGS. 3A to 5B by using a schematic view of a cross section of a door including an outer panel 1, an inner panel 2, and a door trim 3. Note that the mark 4 in the figures shows a glass.

As already described, the heat insulation section (heat insulator) to insulate heat is partially provided on at least one surface of the back surface of the outer panel 1, the both surfaces of the inner panel 2, and the surface of the door trim 3 facing the outer panel 1 to carry out partial heat insulation.

Figure 3A:
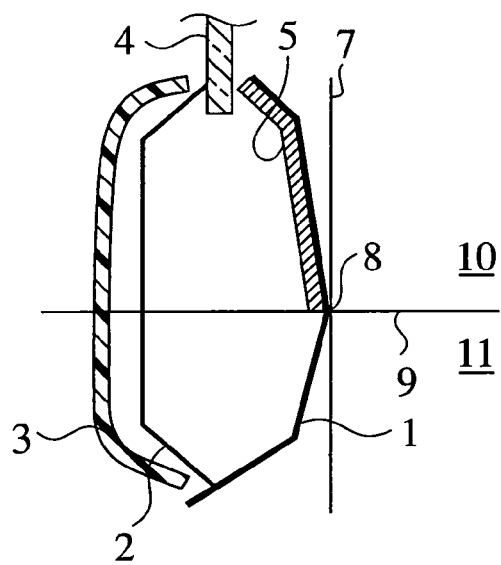
FIG. 3A is a schematic cross-sectional view showing an embodiment in which a high reflectivity material is provided on the upper part of a back surface of an outer panel.
Figure 3B:
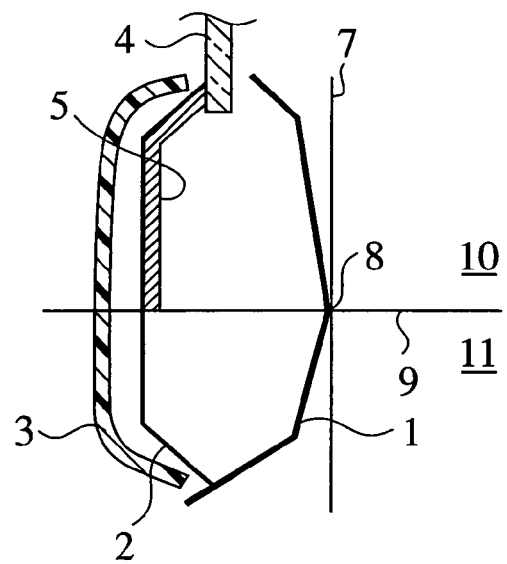
FIG. 3B is a schematic cross-sectional view showing an embodiment in which the high reflectivity material is provided on the upper part of a surface (front surface) of an inner panel facing the outer panel.
Figure 3C:
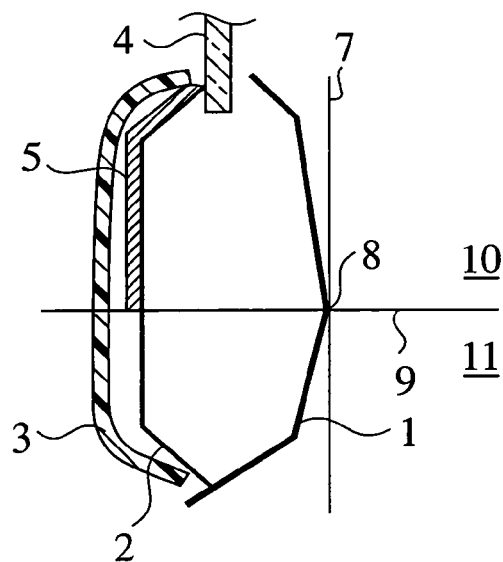
FIG. 3C is a schematic cross-sectional view showing an embodiment in which the high reflectivity material is provided on the upper part of the back surface of the inner panel.
Figure 3D:
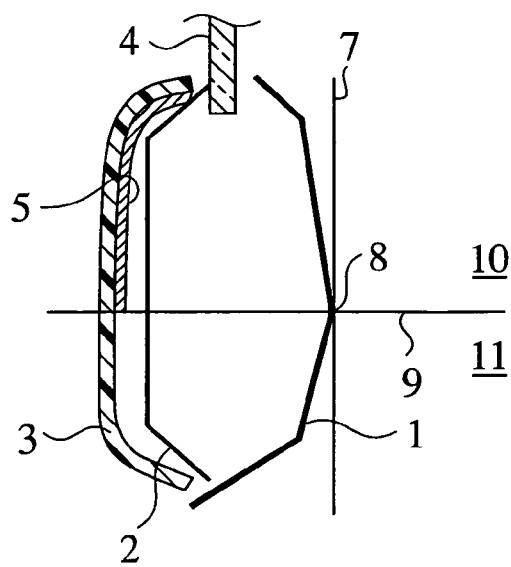
FIG. 3D is a schematic cross-sectional view showing an embodiment in which the high reflectivity material is provided on the upper part of a surface (back surface) of a door trim facing the outer panel.
Figure 4A:
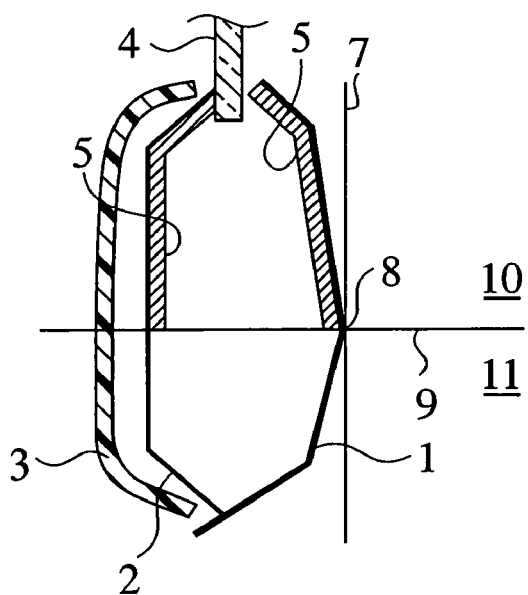
FIG. 4A is a schematic cross-sectional view showing an embodiment in which the high reflectivity material is provided on each of the upper parts of the back surface of the outer panel and the front surface of the inner panel.
Figure 4B:
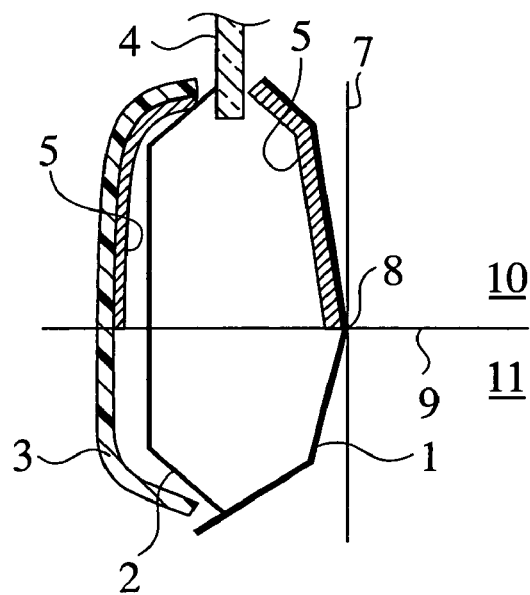
FIG. 4B is a schematic cross-sectional view showing an embodiment in which the high reflectivity material is provided on each of the upper parts of the back surface of the outer panel and the back surface of the door trim.
Figure 4C:
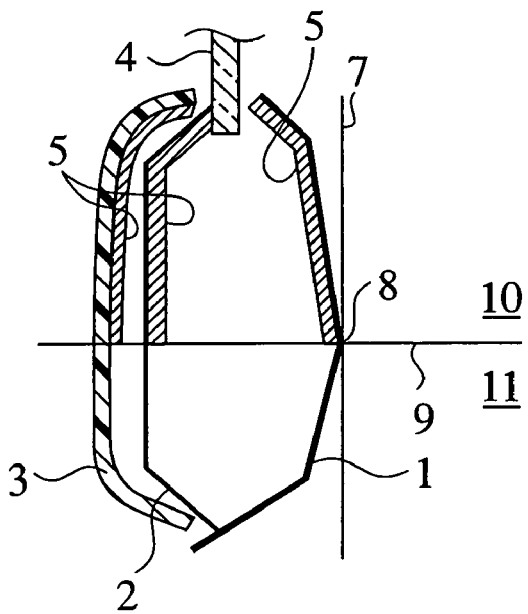
FIG. 4C is a schematic cross-sectional view showing an embodiment in which the high reflectivity material is provided on the upper parts of the back surface of the outer panel, the front surface of the inner panel, and the back surface of the door trim.

FIG. 3A shows an embodiment in which a high reflectivity material 5 is provided on the upper part of the back surface of the outer panel 1 to carry out partial heat insulation. FIG. 3B shows an embodiment in which the high reflectivity material 5 which contributes to reduction in emissivity is provided on the upper part of a surface (front surface) of inner panel 2 facing the outer panel 1 to carry out partial heat insulation. FIG. 3C shows an embodiment in which the high reflectivity material 5 is provided on the upper part of the back surface of the inner panel 2 to carry out partial heat insulation. FIG. 3D shows an embodiment in which the high reflectivity material 5 is provided on the upper part of a surface (back surface) of the door trim 3 facing the outer panel 1 to carry out partial heat insulation. Furthermore, FIG. 4A shows an embodiment in which the high reflectivity material 5 is provided on each of the upper parts of the back surface of the outer panel 1 and the front surface of the inner panel 2 to carry out partial heat insulation. FIG. 4B shows an embodiment in which the high reflectivity material 5 is provided on each of the upper parts of the back surface of the outer panel 1 and the back surface of the door trim 3 to carry out partial heat insulation. FIG. 4C shows an embodiment in which the high reflectivity material 5 is provided on each of the upper parts of the back surface of the outer panel 1, the front surface of the inner panel 2, and the back surface of the door trim 3 to carry out partial heat insulation.

Figure 5A:
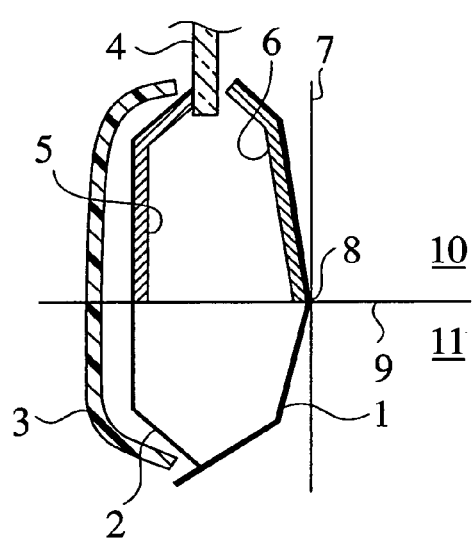
FIG. 5A is a schematic cross-sectional view showing an embodiment in which a heat insulator sheet is attached to the upper part of the back surface of the outer panel and the high reflectivity material is provided on the upper part of the front surface of the inner panel.
Figure 5B:
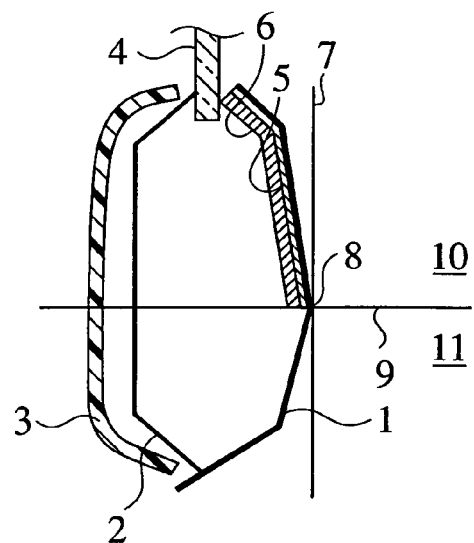
FIG. 5B is a schematic cross-sectional view showing an embodiment in which the heat insulator sheet is attached on the upper part of the back surface of the outer panel and then the high reflectivity material is provided thereon.

The heat insulation section to be used is not limited to one type, and combinations of a plurality of types of the heat insulation section may be employed. Embodiments thereof are shown in FIGS. 5A and 5B. FIG. 5A shows an embodiment in which the heat insulation treatment is partially performed by attaching a heat insulator sheet 6 on the upper part of the back surface of the outer panel 1 and providing the high reflectivity material 5 on the upper part of the front surface of the inner panel 2. FIG. 5B shows an embodiment in which the heat insulation treatment is partially performed by attaching a heat insulator sheet 6 on the upper part of the back surface of the outer panel 1 and then providing the high reflectivity material 5 thereon.

In each of the above embodiments, the border between the section providing the heat insulation function and the section providing the heat dissipation function corresponds to a border line 8 (centering line 8) which connects points at which the ground and tangent lines 7 on the front surface of the outer panel 1 form 90 degree angles. The space above a horizontal line 9 including the border line 8 is indicated by a heat insulation side 10, and the space below the horizontal line 9 is indicated by a heat dissipation side 11. However, it is sufficient that the border between the section providing the heat insulation function and the section providing the heat dissipation function is in a width range of 15 cm above and below the border line 8.

Figure 6:
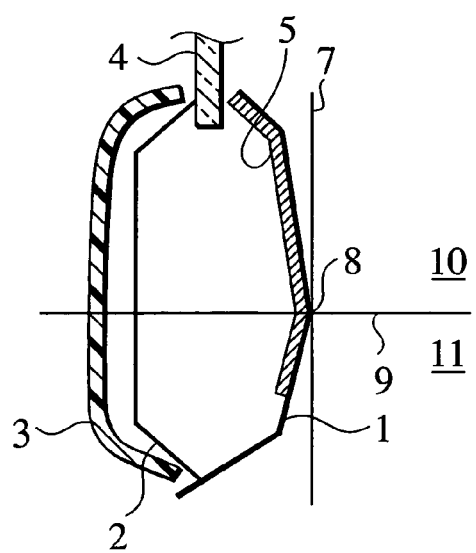
FIG. 6 is a schematic cross-sectional view showing an embodiment in which the high reflectivity material is provided on the back surface of the outer panel 10 cm below a border line as a heat insulation section, the border line connecting points at which the tangent lines on the front surface of the outer panel and the ground form 90 degree angles.

FIG. 6 shows an embodiment in which the high reflectivity material 5 is provided 10 cm below the border line 8 on the back surface of the outer panel 1 as the heat insulation section. Dissipation of heat occurs in the lower part where the heat insulation treatment is not performed. This lower part may be subjected to a treatment to promote this dissipation of heat.

Figure 7A:
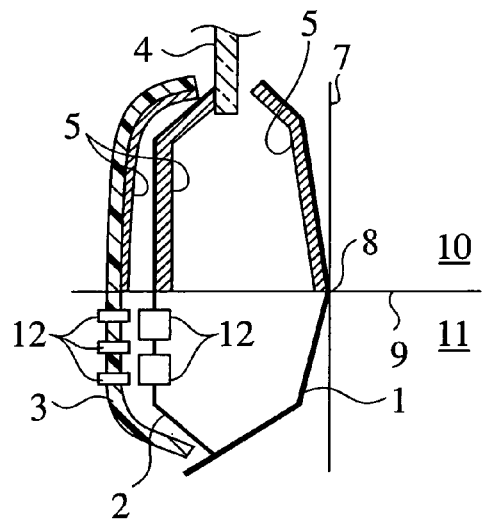
FIG. 7A is a schematic cross-sectional view showing an embodiment in which ventilation holes are provided as a heat dissipation section on the lower part of the trim and the inner panel.

As one of embodiments of the present invention to promote dissipation of heat, ventilation holes 12 can be provided in the lower part of the door trim 3 as shown in FIG. 7A. In this embodiment, heat transfer is promoted by integrally connecting flows of heat in the cross-section direction from air inside the cabin to the front surface of the trim, inside the trim, and from the inside of the trim to the outer panel 1. It is desirable that the ventilation holes 12 are located in a place adjacent to the lower part where the aforementioned heat E transferred from the top to the bottom in the cabin reaches. The role of the ventilation holes 12 is to facilitate the contact of air in the lower part inside the cabin with the outer panel 1 or the inner panel 2 through the door trim 3. It is sufficient that the shape, size, and number of the ventilation holes 12 satisfy other requirements such as design properties and safety of the door trim 3. Moreover, the ventilation holes 12 may be provided in the inner panel 2 in addition to the door trim 3 so that the heat transfer can be promoted.

Figure 7B:
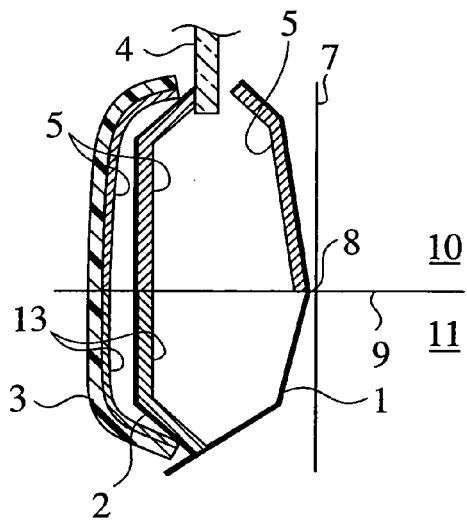
FIG. 7B is a schematic cross-sectional view showing an embodiment in which a coating material is applied on the lower parts of the front surface of the inner panel and the back surface of the door trim, the surface to which the coating material is applied having an emissivity of not less than 0.7 in a far-infrared region.

In another embodiment of the present invention to promote dissipation of heat, as shown in FIG. 7B, a coating material is applied to the lower part of at least one of the back surface of the outer panel 1, both surfaces of the inner panel 2, and a surface of the door trim 3 facing the outer panel 1. Herein, a surface to which the coating material is applied has an emissivity of not less than 0.7 in the far-infrared region. Dissipation of heat can be promoted by increasing the emissivity. With the emissivity less than 0.7, adequate heat transfer cannot be expected. The coating material to increase the emissivity in the far-infrared region to 0.7 or more includes a high emissivity material 13, which includes at least one selected from a group consisting of zirconium oxide, alumina, zircon, titania, aluminum titanate, cordierite, and aluminum silicate. It is desirable that the high emissivity material 13 accounts for 0.3 mass % to 10 mass % of the entire coating material. With the content of less than 0.3 mass %, the effect thereof does not appear, and with the content of more than 10 mass %, sufficient adhesion cannot be ensured. Vehicles used to disperse the high emissivity material 13 are acrylic resin, epoxy resin, polyamide resin, polyurethane resin, polyester resin, polybutadiene resin and modified resins thereof and the like. For the method of coating, a method such as spraying and dipping can be used. The thickness of the paint film is preferably 1 μm to 100 μm, and more preferably, 10 μm to 50 μm. When the thickness of the paint film is less than 1 μm, the function of reducing the emissivity becomes inadequate, and when the thickness thereof is more than 100 μm, a problem such as the paint film peeling will occur.

Figure 7C:
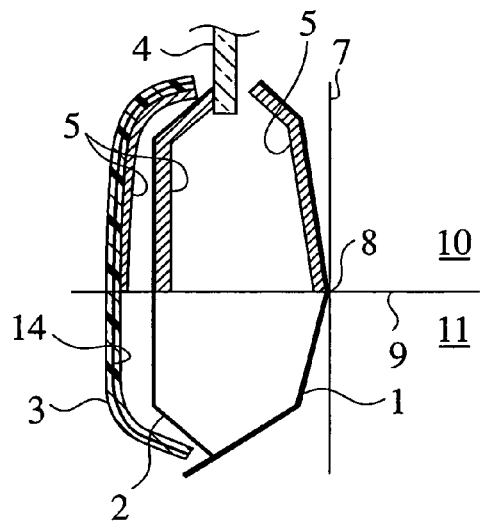
FIG. 7C is a schematic cross-sectional view showing an embodiment in which a good heat conductive material is included in the trim.

In still another embodiment of the present embodiment to promote dissipation of heat, as shown in FIG. 7C, a good heat conductive material 14 is included in the door trim 3. Increasing the thermal conductivity of the door trim 3 itself promotes heat transfer inside the trim among the flows of heat in the cross-section direction from air inside the cabin to the front surface of the trim, inside the trim, and from the inside of the trim to the outer panel 1. The door trim 3 itself includes materials generally used such as polyethylene terephthalate, polypropylene, polyethylene, an acrylic sheet, a styrene sheet, phenol resin, polyphenylene oxide resin, and a wooden board, and the thermal conductivity thereof is as low as 0.5 W/m/K at most. Herein, the good heat conductive material means a material with a thermal conductivity of not less than 10 W/m/K. Metals, high thermally conductive ceramics, carbon fibers, graphite, and the like, and resin complex materials including these materials as fillers are generally good conductive materials. In terms of the method of putting the good heat conductive material 14 into the door trim 3, it is desirable that the good heat conductive material 14 is formed into a sheet or net shape, and then put into the door trim 3 by insert molding. In terms of the size of the good heat conductive material 14, it is desirable that the size covers at least the heat dissipation section of the trim, and more desirable that the size is extended to the heat insulation section. This is because heat passing through the heat insulation section can be transferred to lower temperature parts by thermal conduction before the heat reaches the inside of the cabin through the trim.

In order to obtain more desirable effects, one end of the good heat conductive material 14 may be directly fastened to the outer panel 1, the inner panel 2, or metallic parts fastening these panels. The good heat conductive material and the vehicle body panels can be joined by fastening with screws or bolts and nuts, or welding or adhesion. This enables thermal conduction other than the aforementioned heat transfer in the cross-section direction to be further promoted. In selecting the fastening method, in the light of the spirit of the present invention which intends thermal continuity, a means can be used such as increasing the areas of fastened portions as large as possible and using a thermally conductive seal or paste to ensure the thermal conductivity by filling gaps in the fastened portions, or the like.

As described above, the quantity of heat flux transferred from the outer panel 1 into the cabin interior can be reduced by heat insulation of the upper part of at least one of the back surface of the outer panel 1, both surfaces of the inner panel 2, and the surface of the door trim 3 facing the outer panel 1. Accordingly, the increase in temperature in the cabin interior can be suppressed. Furthermore, by providing the section in the lower part where the aforementioned heat insulation is not carried out, or providing the section which is allowed to actively promote dissipation of heat, dissipation of heat is promoted from the air inside the cabin to the outside of the vehicle through the interior 3 and the outer panel 1. Simultaneously, dissipation of heat held by the interior 3, the outer panel 1, and the air therebetween to the outside of the vehicle is promoted. Consequently, it is possible to provide a vehicle which can promote the thermal comfort in the cabin.

Since the conventional art mostly took into consideration suppressing intrusion of heat into the cabin, dissipation of heat from the cabin was prevented. On the contrary, the present invention does not particularly take heat intrusion into consideration so that heat can easily enter and exit. In the present invention, insulation and dissipation of heat is simultaneously carried out. Accordingly, the thermal environment in the cabin is not extremely deteriorated even when the vehicle is left in blazing sunshine.

The present invention is effective in releasing the thermal energy accumulated in the parts themselves such as the outer panel and the interior and the thermal energy accumulated in the air between the parts. When an air conditioner mounted on the vehicle is activated to lower the air temperature in the cabin and the surface temperature of the interior parts, these thermal energies become incoming heat into the cabin because the temperature difference occur between the inside of the parts and the air in the cabin or the surface temperature of the parts. This is undesirable in terms of the cabin comfort.

In the present invention, since the thermal energy accumulated in the parts themselves such as the outer panel and the interior and the thermal energy accumulated in the air therebetween are radiated to the outside the vehicle, the load on the air conditioner can be reduced.

Next, a description will be given to examples of the present invention, but the present invention is not limited to only these examples.

Figure 8:
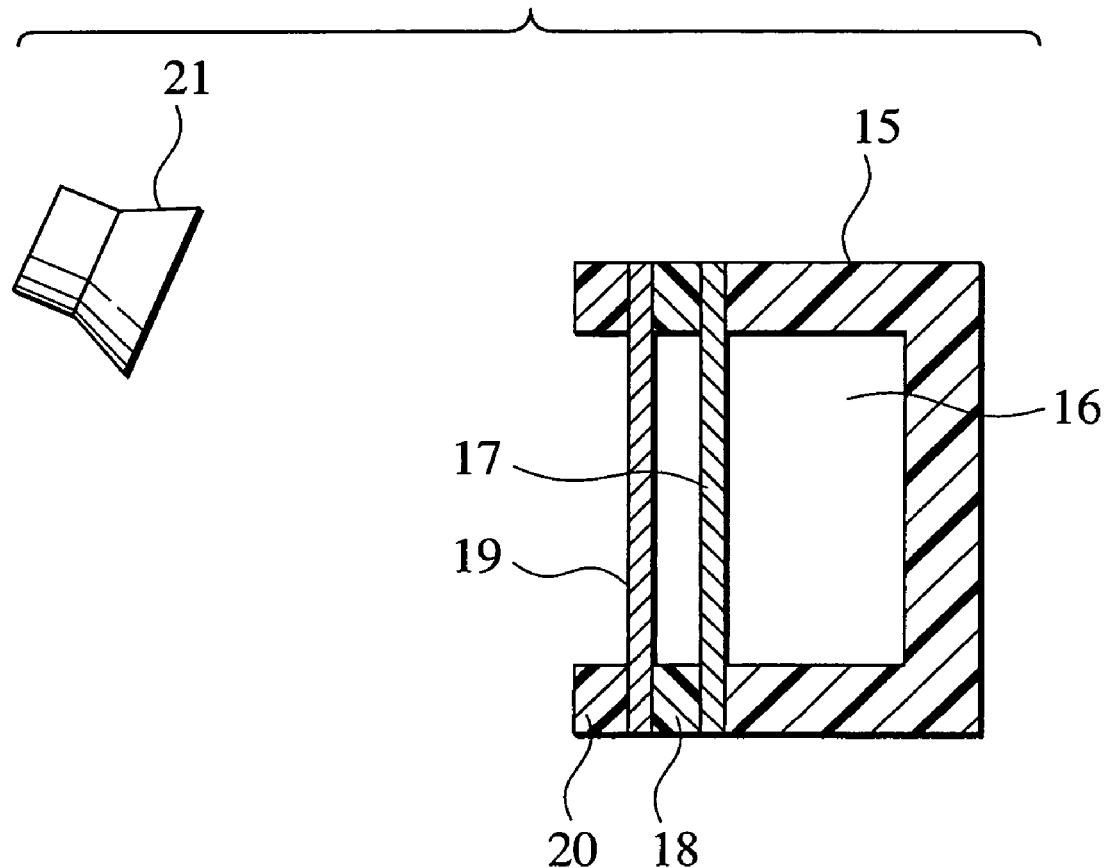
FIG. 8 is a schematic cross-sectional view showing an evaluation unit which simulates the outer panel and space inside the cabin.

A description will be given to common part of the examples. An evaluation unit simulating the outer panel and space inside the cabin to evaluate these examples, which are shown below, was manufactured as follows. FIG. 8 shows a schematic view thereof.

A thermally insulated box 15 with exterior dimensions of 50 cm high×50 cm wide×60 cm deep was prepared. The thermally insulated box 15 had a wall thickness of 10 cm and included a space of 30 cm high×30 cm wide×50 cm deep inside thereof. The internal space 16 of the thermally insulated box 15 simulates a space inside the cabin of the vehicle.

A panel 17 (thermal conductivity: 0.5 W/m/K) of 50 cm high×50 cm wide which included a 1 mm thick polypropylene (PP) resin plate simulating the trim was laid on the thermally insulated box 15 in order to cover an opening (30 cm high×30 cm wide) thereof without gaps. A heat insulator 18 (spacer) having exterior dimensions of 50 cm high×50 cm wide×10 cm deep and a wall thickness of 10 cm was laid on the panel 17. The heat insulator 18 included a space of 30 cm high×30 cm wide×10 cm deep therein. A space corresponding to the space between the interior and the outer panel was thus provided for the evaluation unit.

A panel 19 of 50 cm high×50 cm wide×0.8 mm thick which simulated the outer panel was laid on the heat insulator 18 in order to cover an opening (30 cm high×30 cm wide) thereof without gaps. A heat insulator 20 (spacer) was laid on the panel 19. The heat insulator 20 had exterior dimensions of 50 cm high×50 cm wide×10 cm deep and a wall thickness of 10 cm, and included a space of 30 cm high×30 cm wide×10 cm deep therein.

The panel 19 was prepared in the following manner. An iron test piece (35 cm×35 cm×0.8 mm thick) which was subjected to degreasing and chemical treatment was dipped into Power Top V6 (NIPPON PAINT CO., LTD., gray electrodeposition) to be coated, and baked at 150° C. after water washing. The dry film thickness of the electrodeposited paint film (primer layers on the front and back surfaces) was 20 µm.

Subsequently, ORGA P-28101 (NIPPON PAINT CO., LTD, intermediate coat) was sprayed on one side of the obtained paint film, and furthermore ORGA P-2-1202B (NIPPON PAINT CO., LTD, top coat) was sprayed thereon, then they were simultaneously baked at 150° C. to form a multilayer paint film. This test piece was used as the panel 19 corresponding to the outer panel. The panel 19 was set to direct outward the side where the multilayer film was formed. Both the dry film thickness of the intermediate paint film and the top paint film were 40 µm.

In the following examples, the panels 17 and 19 were subjected to the heat insulation treatment, and subjected to the heat dissipation treatment as required.

FIG. 9 shows a table of the heat insulation sections and the heat insulators in the examples and comparative examples. FIG. 10 shows a table of the heat dissipation sections and the heat dissipation materials in the examples and comparative examples.

EXAMPLE 1

In Example 1, the upper half (15 cm high×30 cm wide) of the surface of the panel 17 facing the panel 19 was set as the heat insulation section. As a heat insulation method, a 12 µm thick PET film (UNITIKA LTD., product name: EMBLET, model number: MP12) having a surface with aluminum deposited was attached to this heat insulation section with an epoxy resin adhesive. The emissivity of the attached film was 0.05, and the thickness of the adhesive layer was 15 µm.

The lower half (15 cm high×30 cm wide) of the surface of the panel 17 facing the panel 19 was set as the heat dissipation section. In the heat dissipation method, the heat dissipation section was not subjected to the heat insulation treatment. Specifically, in Example 1, as the heat dissipation method, the 12 µm thick PET film having a surface deposited with aluminum was not attached on the lower half.

Also in the following Examples 2 to 12, as the heat dissipation method, the heat insulation treatment was only partially performed (upper parts of the panel 17 and/or panel 19), and not performed for the heat dissipation section (lower half of the panel 17).

EXAMPLE 2

In Example 2, instead of the 12 µm thick PET film of Example 1 having a surface with aluminum deposited, 5 µm thick aluminum foil was used. The emissivity of the attached Al foil was 0.05. Example 2 was the same as Example 1 except that Al foil was attached.

EXAMPLE 3

In Example 3, instead of the 12 µm thick PET film of Example 1 having a surface deposited with aluminum, a film was used which was obtained by the following way. Aluminum pigment (TOYO ALUMINUM K.K., leafing aluminum paste) of 10 parts by weight, oil-free polyester resin varnish (DAINIPPON INK AND CHEMICALS INCORPRATION, solid content: 60%) of 5 parts by weight, and polyisocyanate resin (NIPPON POLYURETHANE INDUSTRY CO. LTD., solid content: 70%) of one part by weight were mixed and dispersed, and then diluted by a solvent for adjustment of viscosity. The resultant mixture was sprayed on a 25 µm thick PET film (UNITIKA LTD., product name: EMBLET, model number: S25) in order to obtain a uniform dry film thickness of 20 µm. The emissivity of this paint film was 0.10, and the thickness of the adhesive layer was 15 µm.

Example 3 was the same as Example 1 except that the film coated by Al containing coating material was attached.

EXAMPLE 4

In Example 4, instead of the 12 µm thick PET film of Example 1 having an aluminum deposited surface, a mixture was sprayed on the heat insulation section to obtain a uniform dry film thickness of 20 µm. The mixture was prepared as follows. Aluminum pigment (TOYO ALUMINUM K.K., leafing aluminum paste) of 10 parts by weight, oil-free polyester resin varnish (DAINIPPON INK AND CHEMICALS INCOROPRATION, solid content: 60%) of 5 parts by weight, and polyisocyanate resin (NIPPON POLYURETHANE INDUSTRY CO. LTD., solid content: 70%) of one part by weight were mixed and dispersed, and then diluted by a solvent for adjustment of viscosity. Example 4 was the same as Example 1 except that the Al-containing coating material was applied.

EXAMPLE 5

In Example 5, the upper half (15 cm high×30 cm wide) of a surface of the panel 19 facing the panel 17 was set as the heat insulation section. Similarly to Example 1, the 12 µm thick PET film with the Al deposited surface was attached to the heat insulation section with the epoxy resin adhesive.

EXAMPLE 6

In Example 6, the upper half (15 cm high×30 cm wide) of the surface of the panel 17 facing the panel 19 and the upper half (15 cm high×30 cm wide) of the surface of the panel 19 facing the panel 17 were both set as the heat insulation section. Similarly to Example 1, a 12 µm thick PET film (UNITIKA LTD., product name: EMBLET, model number: MP12) having a surface with aluminum deposited was attached to each of these heat insulation sections with an epoxy resin adhesive. Example 6 was the same as Example 1 except that the PET film was also attached to the upper half of the panel 19.

EXAMPLE 7

In Example 7, an area of 70% (21 cm high×30 cm wide) of the entire surface of the panel 17 extending from the top was set as the heat insulation section. Similarly to Example 1, a 12 µm thick PET film (UNITIKA LTD., product name: EMBLET, model number: MP12) having a surface with aluminum deposited was attached to this heat insulation section with an epoxy resin adhesive. Example 7 was the same as Example 1 except that the area covered with the PET film was increased.

EXAMPLE 8

In Example 8, instead of the 12 µm thick PET film of Example 1 having an aluminum deposited surface, a 1 mm thick PP foam sheet (FURUKAWA ELECTRIC CO., LTD., product name: SLIMACE, expansion ratio: 30 times) was used. Example 8 was the same as Example 1 except that the 1 mm thick PP foam sheet was attached.

EXAMPLE 9

Example 9 was the same as Example 1 except that a 2 mm thick PP foam sheet (SEKISUI CHEMICAL CO., LTD., product name: SOFTRON, expansion rate: 20 times) was attached.

EXAMPLE 10

In Example 10, instead of the foam sheets of Examples 8 and 9, 10 mm thick non-woven fabric (SUMITOMO 3M, product name: THINSULATE) was used. Example 10 was the same as Examples 8 and 9 except that the 10 mm thick non-woven fabric was attached.

EXAMPLE 11

In Example 11, a 12 µm thick PET film (UNITIKA LTD., product name: EMBLET, model number: MP12) having a surface with aluminum deposited was further attached on the 1 mm thick PP foam sheet (FURUKAWA ELECTRIC CO., LTD., product name: SLIMACE, expansion ratio: 30 times) of Example 8. Example 11 was the same as Example 8 except that the 12 µm thick PET film was attached.

EXAMPLE 12

In Example 12, similarly to Example 6, the upper half (15 cm high×30 cm wide) of the surface of the panel 17 facing the panel 19 and the upper half (15 cm high×30 cm wide) of the surface of the panel 19 facing the panel 17 were both set as the heat insulation section. However, a 1 mm thick PP foam sheet (FURUKAWA ELECTRIC CO., LTD., product name: SLIMACE, expansion ratio: 30 times) was attached to the upper half of the opening of the panel 19 instead of the 12 µm thick PET film. Example 12 was the same as Example 6 except that the heat insulator attached to the upper half of the panel 19 was different.

EXAMPLE 13

In Example 13, similarly to Example 1, the upper half (15 cm high×30 cm wide) of the surface of the panel 17 facing the panel 19 was set as the heat insulation section. As heat insulation method, a 12 µm thick PET film (UNITIKA LTD., product name: EMBLET, model number: MP12) having a surface with aluminum deposited was attached to this heat insulation section with an epoxy resin adhesive.

Note that in the following Examples 14 to 16, the heat insulation section and the heat insulation method were the same as those of Example 13.

Moreover, similarly to Example 1, the lower half (15 cm high×30 cm wide) of the surface of the panel 17 facing the panel 19 was set as the heat dissipation section. However, as the heat dissipation method, ten holes (two rows×five holes at regular intervals) with a diameter of 0.5 mm were opened to provide ventilation holes.

EXAMPLE 14

In Example 14, similarly to Example 1, the lower half (15 cm high×30 cm wide) of the surface of the panel 17 facing the panel 19 was set as the heat dissipation section. Zirconium oxide of 10 parts by weight, oil-free polyester resin varnish (DAINIPPON INK AND CHEMICALS INCOROPRATION, solid content: 60%) of 5 parts by weight, and polyisocyanate resin (NIPPON POLYURETHANE INDUSTRY CO. LTD., solid content: 70%) of 1 part by weight were mixed and dispersed, and then diluted by a solvent for adjustment of viscosity. The resultant mixture was uniformly sprayed on this heat dissipation section in order to obtain a dry film thickness of 20 µm. The emissivity of this paint film was 0.89. Example 14 was the same as Example 1 except that the high emissivity coating was applied as the heat dissipation method.

EXAMPLE 15

In Example 15, the entire area (30 cm high×30 cm wide) of the surface of the panel 17 facing the panel 19 and the lower half (15 cm high×30 cm wide) of the surface of the panel 19 facing the panel 17 were both set as the heat dissipation sections. The coating material used in Example 14 was applied to these heat dissipation sections. Example 15 was the same as Example 14 except that the high emissivity coating was applied to the upper half of the panel 17 and the lower half of the opening of the panel 19.

EXAMPLE 16

In the Example 16, the entire panel 17 (30 cm high×30 cm wide) facing the panel 19 was set as the heat dissipation section. The panel 17 was replaced with a panel, in which a 0.2 mm thick iron sheet (thermal conductivity: 60.5 W/m/K) was sandwiched between two 0.4 mm-thick PP resin sheets. The emissivity of the part to which the coating material was applied was 0.84. Example 16 was the same as Example 15 except that the heat dissipation section and the construction of the panel 17 were altered.

COMPARATIVE EXAMPLE 1

As Comparative Example 1, the thermally insulated box which was not subjected to both the heat insulation treatment and the heat dissipation treatment was manufactured.

COMPARATIVE EXAMPLE 2

In Comparative Example 2, with respect to Examples 1 and 7, the entire area of the surface of the panel 17 facing the panel 19 was set as the heat insulation section. Similarly to Example 1 and 7, a 12 μm thick PET film (UNITIKA LTD., product name: EMBLET, model number: MP12) having a surface with aluminum deposited was attached to this heat insulation section with an epoxy resin adhesive.

COMPARATIVE EXAMPLE 3

In Comparative Example 3, with respect to Example 5, the entire surface (30 cm high×30 cm wide) of the panel 19 facing the panel 17 was set as the heat insulation section. Similarly to Examples 5 and 6, a 12 μm thick PET film (UNITIKA LTD., product name: EMBLET, model number: MP12) having a surface with aluminum deposited was attached to this heat insulation section with an epoxy resin adhesive.

COMPARATIVE EXAMPLE 4

In Comparative Example 4, with respect to Example 8, the entire area (30 cm high×30 cm wide) of the surface of the panel 17 facing the panel 19, namely, the entire surface of the opening of the panel 17 was set as the heat insulation section. Similarly to Example 8, a 1 mm thick PP foam sheet (FURUKAWA ELECTRIC CO., LTD., product name: SLI-MACE, expansion ratio: 30 times) was attached to this heat insulation section.

(Evaluation Method)

The evaluation unit with the panels 17 and 19 stacked as described above was placed laterally so that the panels 17 and 19 were along the vertical direction. A sun lamp 21 (artificial sun lamp Solax500 made by CERIC LTD.) was placed at a distance 50 cm apart from the heat insulator 20 with a depression angle of 45 degree to the panel 19 so that the bottom end of the sun lamp 21 was placed above the upper part of the heat insulator 20. The evaluation unit was irradiated by the sun lamp 21 for 120 minutes so that the light intensity was 1000 W/m$^2$ in the center of the panel 19. After the irradiation for 120 minutes, the surface temperatures were measured at the positions 5 cm and 25 cm from the top which were on a center line (15 cm from the end) of the surface (30 cm high×30 cm wide) of the panel 17 facing to the internal space 16 side. In addition, the air temperature was measured at the position 10 cm apart from each position (5 cm and 25 cm from the top) to the internal space 16 side.

FIG. 11 shows measurement results of Examples and Comparative Examples. In this table, the position 5 cm from the top is designated by "upper part", and the position 25 cm from the top is designated by "lower part".

As clearly shown in comparison of the measurement results of Examples with the measurement results of Comparative examples, the temperature of each Example was far lower than that of corresponding Comparative Example compared at the same position.

For example, comparing Example 1 in which the upper half of the panel 17 corresponding to the trim was subjected to the heat insulation treatment, and the lower half was subjected to the heat dissipation treatment, and Comparative Example 1 which was not subjected to the heat insulation treatment and the heat dissipation treatment, the surface temperatures of the upper and lower parts and the air temperatures of the upper and lower parts of Example 1 could be reduced compared with those of Comparative Example 1 by 23.1, 16.5, 22.2, and 17.8° C., respectively.

Comparing Example 1 with Comparative Example 2 in which the entire panel 17 was subjected to the heat insulation treatment but not subjected to the heat dissipation treatment, the surface temperatures of the upper and lower parts and the air temperatures of the upper and lower parts of Example 1 could be reduced compared with those of Comparative Example 2 by 12.9, 9.9, 12.2, and 9.4° C., respectively.

Comparing Example 7 in which 70% of the panel 17 from the top was subjected to the heat insulation treatment and the lower 30% was subjected to the heat dissipation treatment with Comparative Example 2, the surface temperatures of the upper and lower parts and the air temperatures of the upper and lower parts of Example 7 could be reduced compared with those of Comparative Example 2 by 15.3, 14.7, 16.7, and 13.2° C., respectively.

Comparing Example 5 in which the upper half of the panel 19 corresponding to the outer panel was subjected to the heat insulation treatment and the lower half of the panel 17 was subjected to the heat dissipation treatment with Comparative Example 3 in which the entire panel 19 was subjected to the heat insulation treatment but not subjected to the heat dissipation treatment, the surface temperatures of the upper and lower parts and the air temperatures of the upper and lower parts of Example 5 could be reduced compared with those of Comparative Example 3 by 13.1, 11.3, 12.3, and 10.5° C., respectively.

Comparing Example 6 in which the upper halves of the panels 17 and 19 were subjected to the heat insulation treatment and the lower half of the panel 17 was subjected to the heat dissipation treatment with Comparative Example 3, the surface temperatures of the upper and lower parts and the air temperatures of the upper and lower parts of Example 6 could be reduced compared with those of Comparative Example 3 by 12.6, 11.2, 11.9, and 10.5° C., respectively.

Similarly to the comparison between Example 1 and Comparative Example 2, comparing Example 8 and Comparative Example 4 in which the heat insulation method was altered into attaching the 1 mm thick PP foam sheet, the surface temperatures of the upper and lower parts and the air temperatures of the upper and lower parts of Example 8 could be reduced compared with those of Comparative Example 4 by 17.6, 13.9, 17.0, and 13.9° C., respectively.

With the above description, effects provided by the present invention was confirmed in which the thermal comfort in the cabin could be promoted by suppressing heat intrusion from portions of the outer panel which was subject to heat into the cabin interior and promoting dissipation of heat from the cabin interior to the outside.

The entire content of a Japanese Patent Application No. P2002-381886 with a filing date of Dec. 27, 2002 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A vehicle body panel structure, comprising:
an outer panel;
an inner panel facing the outer panel; and
a trim of a cabin interior,
wherein at least one surface of:
  a back surface of the outer panel,
  a surface of the inner panel facing the outer panel,
  a surface of the inner panel facing away from the outer panel, and
  a surface of the trim facing the outer panel,
  includes heat insulation to insulate the at least one surface in addition to the structure of the respective outer panel, inner panel and trim, to provide the vehicle body panel structure with both functions of heat insulation and heat dissipation, the heat insulation being located on the at least one surface, the heat insulation extending over a whole area extending from a first border that is about at the bottom of a door window opening to a second border that is in a width between 15 cm above and below a border line connecting respective points at which tangent lines on a front surface of the outer panel and the ground form 90 degree angles.

2. A vehicle body panel structure according to claim 1, wherein a heat dissipater adapted to facilitate dissipation of heat is provided for at least a portion of a surface other than a portion of the surface which is insulated by the heat insulation.

3. A vehicle body panel structure according to claim 1, wherein the heat insulation comprises a low emissivity film having a low emissivity in a far-infrared region attached to the respective surface with an adhesive.

4. A vehicle body panel structure according to claim 3, wherein the low emissivity film includes at least one selected from a group consisting of an aluminum foil, a copper foil, an aluminum foil with a surface protected by a transparent resin layer, a copper foil with a surface protected by a transparent resin layer, a resin film with aluminum adhered thereto, a resin film with a reflective coating material applied thereto, and a resin film with a reflector and/or white pigment mixed therein.

5. A vehicle body panel structure according to claim 1, wherein the heat insulation comprises a painted coating material which reduces emissivity of a painted surface in a far-infrared region.

6. A vehicle body panel structure according to claim 5, wherein the coating material includes aluminum flakes.

7. A vehicle body panel structure according to claim 1, wherein the heat insulation is an attached heat insulator sheet.

8. A vehicle body panel structure according to claim 7, wherein the heat insulator sheet includes at least one selected from a group consisting of a foamed resin sheet, a non-woven fabric, and a web.

9. A vehicle body panel structure according to claim 1, wherein in a case where there are a plurality of border lines, a border line closest to the ground is a base line determining the border between the heat insulation and the section of the structure of the respective outer panel, inner panel and trim without the heat insulation providing heat dissipation.

10. A vehicle body panel structure according to claim 2, wherein the heat dissipater comprises a ventilation hole in a lower part of the trim.

11. A vehicle body panel structure according to claim 10, wherein the ventilation hole as the heat dissipater is further provided in the inner panel.

12. A vehicle body panel structure according to claim 2, wherein a heat dissipater comprises a coating which gives not less than 0.7 of emissivity of a coated surface in a far-infrared region.

13. A vehicle body panel structure according to claim 12, wherein a coating material in the coating includes a high emissivity material comprising at least one selected from a group consisting of zirconium oxide, alumina, zircon, titania, aluminum titanate, cordierite, and aluminum silicate.

14. A vehicle body panel structure according to claim 2, wherein the heat dissipater includes the trim, wherein the trim includes a good heat conductive material.

15. A vehicle body panel structure according to claim 14, wherein the good heat conductive material comprises at least one of a metallic fiber, a carbon fiber, and a composite material including these fibers.

16. A vehicle body panel structure according to claim 14, wherein the good heat conductive material has one of a sheet shape and a net shape.

17. A vehicle body panel structure according to claim 16, wherein the good heat conductive material is included in the trim by an insert molding.

18. A vehicle body panel structure, comprising:
an outer panel;
an inner panel facing the outer panel; and
a trim of a cabin interior,
wherein at least one surface of:
  a back surface of the outer panel,
  a surface of the inner panel facing the outer panel,
  a surface of the inner panel facing away from the outer panel, and
  a surface of the trim facing the outer panel,
  includes a heat insulation means for providing the vehicle body panel structure with both functions of heat insulation and heat dissipation, wherein the heat insulation means is located on the at least one surface, the heat insulation means extending over a whole area extending from a first border that is about at the bottom of a door window opening to a second border that is in a width between 15 cm above and below a border line connecting respective points at which tangent lines on a front surface of the outer panel and the ground form 90 degree angles.

19. A vehicle body panel structure according to claim 18, wherein the heat insulation means is in addition to the structure of the respective outer panel, inner panel and trim.

20. A vehicle body panel structure, comprising:
an outer panel;
an inner panel facing the outer panel; and
a trim of a cabin interior,
wherein at least one surface of:
  a back surface of the outer panel,
  a surface of the inner panel facing the outer panel,
  a surface of the inner panel facing away from the outer panel, and
  a surface of the trim facing the outer panel,
  includes partial heat insulation to insulate the at least one surface in addition to the structure of the respective outer panel, inner panel and trim, to provide the vehicle body panel structure with both functions of heat insulation and heat dissipation, the partial heat insulation comprising a low emissivity film having a low emissivity in a far-infrared region attached to the respective surface with an adhesive, and the partial heat insulation being located on the at least one surface only above a border line connecting respective points at which tangent lines on a front surface of the outer panel and the ground form 90 degree angles.

21. A vehicle body panel structure according to claim 20, wherein a heat dissipater adapted to facilitate dissipation of heat is provided for at least a portion of a surface other than a portion of the surface which is insulated by the heat insulation.

22. A vehicle body panel structure according to claim 20, wherein the low emissivity film includes at least one selected from a group consisting of an aluminum foil, a copper foil, an aluminum foil with a surface protected by a transparent resin layer, a copper foil with a surface protected by a transparent resin layer, a resin film with aluminum adhered thereto, a resin film with a reflective coating material applied thereto, and a resin film with a reflector and/or white pigment mixed therein.

23. A vehicle body panel structure according to claim 20, wherein in a case where there are a plurality of the border lines, the border line closest to the ground is a base line determining the border between the heat insulation and the section of the structure of the respective outer panel, inner panel and trim without the heat insulation providing heat dissipation.

24. A vehicle body panel structure, comprising:
an outer panel;
an inner panel facing the outer panel; and
a trim of a cabin interior,
wherein at least one surface of:
  a back surface of the outer panel,
  a surface of the inner panel facing the outer panel,
  a surface of the inner panel facing away from the outer panel, and
  a surface of the trim facing the outer panel,
includes partial heat insulation to insulate the at least one surface in addition to the structure of the respective outer panel, inner panel and trim, to provide the vehicle body panel structure with both functions of heat insulation and heat dissipation, the partial heat insulation comprising a low emissivity film having a low emissivity in a far-infrared region attached to the respective surface with an adhesive, and the partial heat insulation being located on the at least one surface, the partial heat insulation extending from a first border that is about at the bottom of a door window opening to a second border that is in a width between 15 cm above and below a border line connecting respective points at which tangent lines on a front surface of the outer panel and the ground form 90 degree angles.

25. A vehicle body panel structure according to claim 24, wherein a heat dissipater adapted to facilitate dissipation of heat is provided for at least a portion of a surface other than a portion of the surface which is insulated by the heat insulation.

26. A vehicle body panel structure according to claim 24, wherein the low emissivity film includes at least one selected from a group consisting of an aluminum foil, a copper foil, an aluminum foil with a surface protected by a transparent resin layer, a copper foil with a surface protected by a transparent resin layer, a resin film with aluminum adhered thereto, a resin film with a reflective coating material applied thereto, and a resin film with a reflector and/or white pigment mixed therein.

27. A vehicle body panel structure according to claim 24, wherein in a case where there are a plurality of border lines, a border line closest to the ground is a base line determining the border between the heat insulation and the section of the structure of the respective outer panel, inner panel and trim without the heat insulation providing heat dissipation.

28. A vehicle body panel structure, comprising:
an outer panel;
an inner panel facing the outer panel; and
a trim of a cabin interior,
wherein at least one surface of:
  a back surface of the outer panel,
  a surface of the inner panel facing the outer panel,
  a surface of the inner panel facing away from the outer panel, and
  a surface of the trim facing the outer panel,
includes partial heat insulation to insulate the at least one surface in addition to the structure of the respective outer panel, inner panel and trim, to provide the vehicle body panel structure with both functions of heat insulation and heat dissipation, the partial heat insulation comprising a painted coating material which reduces emissivity of a painted surface in a far-infrared region, and the partial heat insulation being located on the at least one surface, the partial heat insulation extending from a first border that is about at the bottom of a door window opening to a second border that is in a width between 15 cm above and below a border line connecting respective points at which tangent lines on a front surface of the outer panel and the ground form 90 degree angles.

29. A vehicle body panel structure according to claim 28, wherein a heat dissipater adapted to facilitate dissipation of heat is provided for at least a portion of a surface other than a portion of the surface which is insulated by the heat insulation.

30. A vehicle body panel structure according to claim 28, wherein the coating material includes aluminum flakes.

31. A vehicle body panel structure according to claim 28, wherein in a case where there are a plurality of border lines, a border line closest to the ground is a base line determining the border between the heat insulation and the section of the structure of the respective outer panel, inner panel and trim without the heat insulation providing heat dissipation.

32. A vehicle body panel structure, comprising:
an outer panel;
an inner panel facing the outer panel; and
a trim of a cabin interior,
wherein at least one surface of:
   a back surface of the outer panel,
   a surface of the inner panel facing the outer panel,
   a surface of the inner panel facing away from the outer panel, and
   a surface of the trim facing the outer panel,
includes partial heat insulation to insulate the at least one surface in addition to the structure of the respective outer panel, inner panel and trim, to provide the vehicle body panel structure with both functions of heat insulation and heat dissipation, the partial heat insulation comprising a painted coating material which reduces emissivity of a painted surface in a far-infrared region, and the partial heat insulation being located on the at least one surface only above a border line connecting respective points at which tangent lines on a front surface of the outer panel and the ground form 90 degree angles.

33. A vehicle body panel structure according to claim 32, wherein a heat dissipater adapted to facilitate dissipation of heat is provided for at least a portion of a surface other than a portion of the surface which is insulated by the heat insulation.

34. A vehicle body panel structure according to claim 32, wherein the coating material includes aluminum flakes.

35. A vehicle body panel structure according to claim 32, wherein in a case where there are a plurality of the border lines, the border line closest to the ground is a base line determining the border between the heat insulation and the section of the structure of the respective outer panel, inner panel and trim without the heat insulation providing heat dissipation.

* * * * *